United States Patent
Cheng et al.

[11] Patent Number: 6,134,842
[45] Date of Patent: Oct. 24, 2000

[54] INTEGRATED WINDOW/LIGHT SHELF SYSTEM

[76] Inventors: Chi Cheng; Akimi C. Cheng, both of 391 Western Ave., Clarendon Hills, Ill. 60541-1314

[21] Appl. No.: 08/832,300

[22] Filed: Apr. 3, 1997

[51] Int. Cl.[7] .................. E06B 9/26; F24J 2/54
[52] U.S. Cl. .................. 52/1; 52/171.1; 52/473; 52/786.1; 126/702; 359/596
[58] Field of Search .................. 52/1, 171.1, 473, 52/786.1; 126/701, 702, 703; 359/596

[56] References Cited

U.S. PATENT DOCUMENTS

| | | | |
|---|---|---|---|
| 2,239,528 | 4/1941 | Knudsen | 52/473 X |
| 2,490,295 | 12/1949 | Fisher | 52/786.1 X |
| 2,774,421 | 12/1956 | Lion | 359/360 |
| 2,925,634 | 2/1960 | Ewing | 52/473 X |
| 3,068,753 | 12/1962 | Kirkpatrick | 359/596 |
| 4,002,159 | 1/1977 | Angilletta | 126/703 X |
| 4,068,653 | 1/1978 | Bourdon et al. | 126/701 X |
| 4,159,707 | 7/1979 | Miquel | 126/702 |
| 4,219,008 | 8/1980 | Schultz | 126/702 X |
| 4,220,137 | 9/1980 | Tesch et al. | 126/702 |
| 4,301,787 | 11/1981 | Rice | 126/702 |
| 4,327,795 | 5/1982 | Wheeler | 126/702 X |
| 4,351,320 | 9/1982 | Tetirick | 126/702 X |
| 4,424,800 | 1/1984 | Ortega | 126/703 X |
| 4,527,544 | 7/1985 | Wolf et al. | 126/702 X |
| 4,658,806 | 4/1987 | Boozer | 126/703 |
| 4,899,491 | 2/1990 | Okumoto | 359/596 X |
| 4,978,181 | 12/1990 | Inanuma et al. | 359/596 X |
| 5,221,363 | 6/1993 | Gillard | 52/786.1 X |

FOREIGN PATENT DOCUMENTS

| | | | |
|---|---|---|---|
| 57-65538 | 4/1982 | Japan | 126/702 |
| 57-70333 | 4/1982 | Japan | 126/702 |
| 486189 | 1/1976 | U.S.S.R. | 126/702 |
| 2125531 | 3/1984 | United Kingdom | 52/702 |
| 2240576 | 8/1991 | United Kingdom | 52/171.1 |

OTHER PUBLICATIONS

"Turning Low Solar Heat Gain Windows into Energy Saving in Winter", D. Feuermann and A. Novoplansky, The Jacob Blaustein Institute for Desert Research, Ben–Gurion University of the Negev, 84990, Israel, 1996.

Optics Guide 5, Chapter 4 Optical Coatings, by Melles Griot, 1–800–835–2626, 1770 Kettering St. Irvine, CA 92714, USA FAX: (714) 261–7586, Chapter 4: Optical Coatings.

*Primary Examiner*—Laura A. Callo

[57] ABSTRACT

A window/light shelf system enhances the daylight illumination with no glare. The air space between the double panes of the window is enlarged, and a mini blind-like, light reflective or absorbing, low transparent glass plates unit is integrated in the middle to control the daylighting and to eliminate the glare. With the light reflective unit open and closed per solar/climate conditions, the system serves as a window, a light shelf with no glare, a solar heating source in the winter, and a solar heat reflector in the summer.

4 Claims, 2 Drawing Sheets

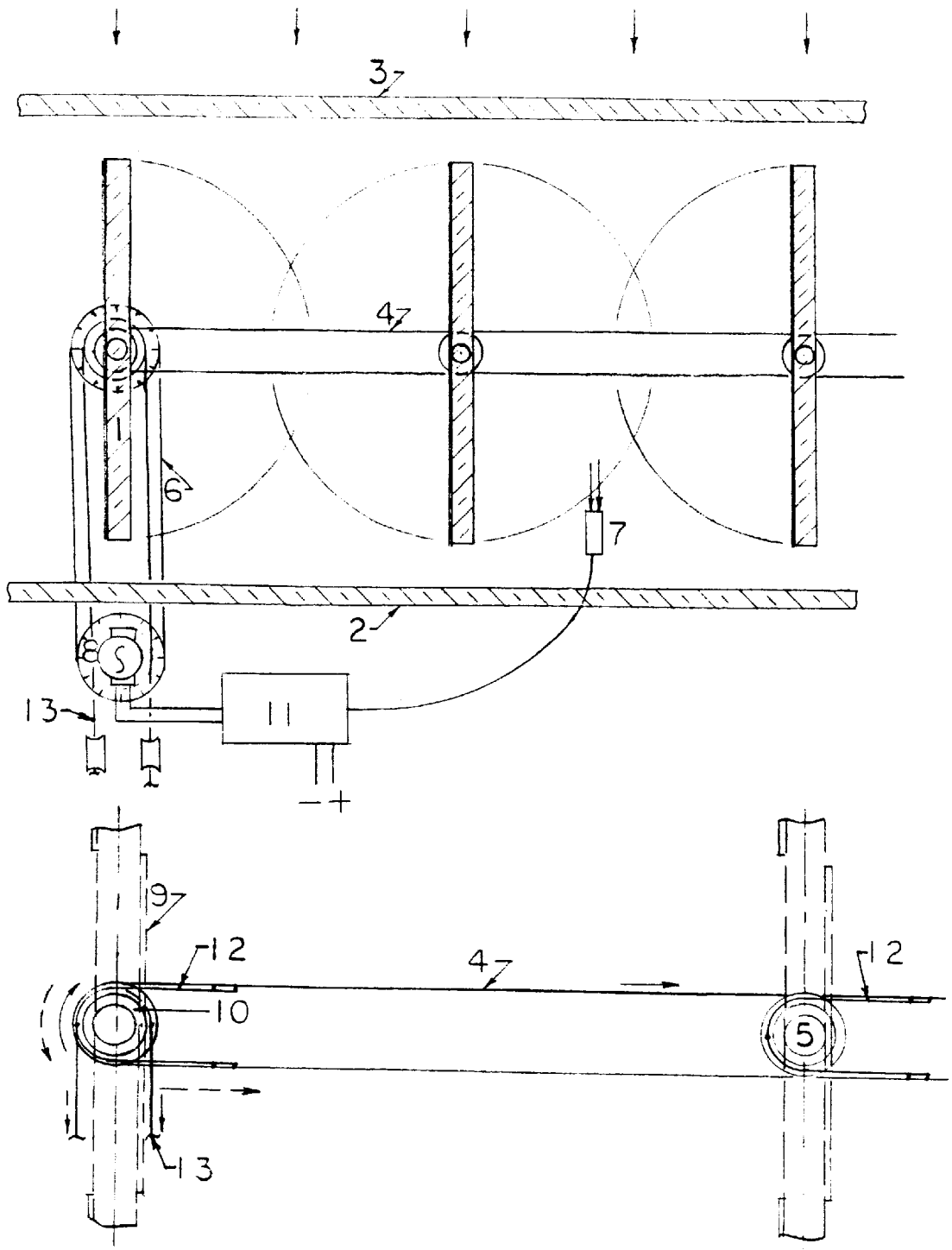

INTEGRATED WINDOW/LIGHT SHELF SYSTEM

BACKGROUND OF THE INVENTION

Windows enhance the natural daylighting but bring in the glare. To reduce or minimize the glare, the mini blind, curtain and drape have been invented and applied. Window fails as a light shelf. Hence, architect applies additional light shelves to improve the daylighting distribution in a building, and it increases the electric energy cost. To avoid the additional light shelves and energy cost, we need an integrated window/light shelf system without glare.

Also, for the winter solar heating, windows with high transparent, anti-reflective film between two glass panes are located along the south wall. To reduce the summer solar heat gain and lower the summer cooling load, windows with an exterior, tinted or selectively absorbing pane are used. The needs of windows for the summer and winter are opposite and impose a conflict to each other. Can the same window serve both needs?

A natural way to eliminate the glare is to reduce the sun light intensity. To provide the illumination simultaneously, the remainder of the sun light needs to be transmitted. For the variation of solar and climate conditions, the system must provide a range of transmittance and shading coefficient. Hence, a window and a blind-like, light reflective/low transparent glass plate unit should be integrated to control the sun light intensity. To meet the needs of being a solar heat transmitter in the winter and a solar heat reflector in the summer, the reflective glass unit must be able to open and close by a control device. Such an idea leads to this invention.

1. Field of Invention

This invention relates to a field of systems and products for passive solar energy and building applications. These applications include the solar cooling load reduction in the summer, the solar heating in the winter, and daylighting distribution for the illumination to reduce the light shelves and electric energy.

2. Description of the Prior Art

The paper, "Turning Low Solar Heat Gain Windows into Energy Saving in Winter", were presented by D. Feuermann and A. Novoplansky of Ben-Gurion University of the Negev, Sede Boker Campus, 84990 at the ASES' 21st National Passive Solar Conference at Boulder, Colo. in 1996. The reduction in summer peak cooling loads of buildings is often achieved by windows with a low solar heat gain coefficient. These windows are typically doubled glazed with the exterior pane tinted or selectively absorbing. Absorbed solar radiation is rejected to the environment. This is undesirable in the cold season. The authors suggested to turn south facing windows by 180° for the duration of the cold season. Through the computer simulation, they had estimated seasonal energy savings for a model room in several climates. Windows whose positions are designed to be reversible are commercially available for ease of cleaning. These rotatory windows will serve the solar heat source in the winter and the summer cooling load reduction simultaneously. However, these windows are not designed to serve the purpose of eliminating the solar glare while providing the daylighting for the building illumination.

Commercially, there are numerous designs and products of mini-blind, drapes, curtains and shutters to control and eliminate the glare. However, they mostly block the glare. They may allow the glare to leak through and present part of the bad effect from the glare. Light shelves are used to compensate the illumination. The problem of mini-blind for a window to function as a light shelf is that the blade material is typically plastic and non-transparent. Sun light and glare are blocked rather than controlled. The solar heat are absorbed by the curtain and added to the cooling load in the summer. The solar heat is reflected or blocked by the blind or shutter. The winter solar heating through a window gets lost.

The multi-purposes of a window as a light shelf with no glare, solar heating in the winter, and solar cooling load reduction in the summer have never achieved in one design. We are providing such a window/light shelf system in this invention.

SUMMARY OF THE INVENTION

This invention is to integrate a window with double or triple glazing, and an inner-positioned, mini blind-like, light reflective glass unit. The blind-like glass plates are translucent. When the unit is closed in a shining day, such an unit of glass plates will reflect 70% or more of the sun light and solar heat, and transmit the remainder to illuminate the building. When the unit is open, most of the sunlight and solar heat will pass through, and the window will regain the full benefit of solar heating in the winter.

When the unit is partially open or closed, some of the sun light will be transmitted and a portion of the reflected sunlight will be re-reflected and passed through the window. In the winter for the maximum solar heating, the reflection may be directed toward the ceiling or hall way for the benefit of daylight illumination and solar heating. In the summer, the reflection is always directed outside the building except the very cloudy climate while the additional illumination from the light shelves is needed.

Technically, this integrated window/light shelf system offers a range o r multiplicity of transmittance and shading coefficient rather than a single value for the multiple functions of the daylight illumination, the summer solar heat reduction and the winter solar heat transmission. This can be illustrated in the following table:

| | Window Glazing Properties | |
|---|---|---|
| Glazing ⅛" | Solar Transmittance | Shading Coefficient, $f_s$ |
| Single | 0.85 | 1.00 |
| Double | 0.74 | 0.90 |
| Double with low-e, soft/hard coat on the on the outer surface of inner pane, | | |
| Soft: | 0.52 | 0.74 |
| Hard: | 0.51 | 0.83 |
| Double with a blind-like, light reflective glass unit with $f_s$ = 0.30 | | |
| Unit closed: | 0.20+ | 0.27 |
| Unit open: | 0.74 | 0.90 |
| Unit partially closed/open: | 0.2–0.74 | 0.27–0.90 |

For window facing either east or west, the glass plates of the reflective unit are standing parallel to each other vertically. It reduces and eliminates the glare effectively at one closing angle. For windows facing south in the north hemisphere and vice versa, the glass plates are parallel to each other horizontally.

These translucent glass or fiberglass plates are turning in synchronized motion through looped wire, timing belt, and others, manually or automatically.

With such an integrated window/light shelf system, the illumination of a building can be furnished with natural daylight and no glare for the whole year. By keeping the reflective unit closed in the summer, most of the sunlight and solar heat can be reflected outside the window, and the cooling load of the building will be reduced. With the reflective unit open in the winter, most of the sunlight and solar heat will pass through the window to warm up the building. In the night, the closing and the opening of the unit is reversed. In closing state, the reflective side is facing inward. The system lets the room to radiate the heat out of the building in the summer, and keeps the radiant heat of the room inside the building in the winter.

Energy conservation will be achieved through a saving combination of the following:

1. a reduction of the electrical light shelves and energy,
2. a solar heat gain in the day, and a reduction of the heat loss from the rrom's radiation through the window in the night during the winter, and
3. a cooling load reduction due to the solar heat reduction in the day, and a cooling down and heat radiation of the room through the window in the night during the summer.

BRIEF DESCRIPTION OF THE DRAWINGS

FIG. 3 is the schematic view of the light-reflective/glass plate unit and its turning mechanism.

FIG. 4 is the schematic drawing of the turning mechanism with a looped wire, timing belt, a Limit-angle torque (LAT) motor, a light sensor and a switching circuit.

DETAIL DESCRIPTION

Figure 1:
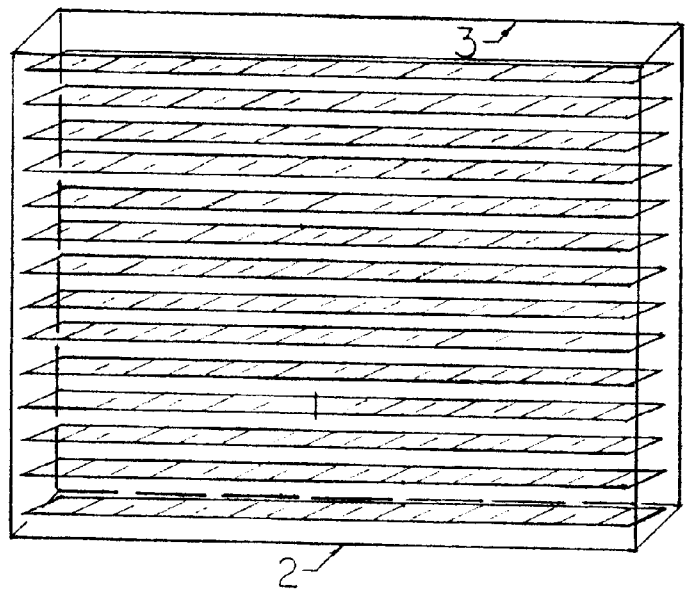
FIG. 1 is the schematic view of an Integrated Window/Light Shelf System with a horizontal blind-like,light reflective glass plate unit in the middle.
Figure 2:
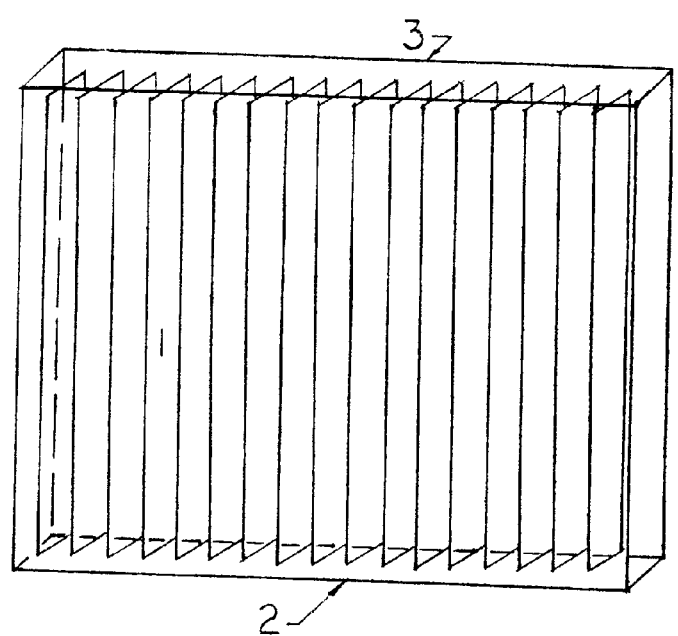
FIG. 2 is the schematic view of an Integral Window/Light Shelf System with a vertical blind-like, light reflective glass plate unit in the middle.

In FIGS. 1 and 2, the air space of a window with double panes, #2 and #3, is enlarged, and a blind-like, light reflective/absorbing glass plate unit is integrated and located in the middle. The inner pane, #2, can be a vacuum degased, heat insulated double panes itself, and the double panes window becomes a triple panes. Both inner and outer panes are highly clear and transparent. The parallel glass plates, #1, are translucent, low transparent and light reflective or absorbing on one side, say R/A on left side. They can be substituted by translucent fiberglass plates. The glass plates can be silver reflective with a shadow coefficient of 0.30 or 0.23, or gray reflective with a shadow coefficient of 0.30 or 0.14 which varies and depends on the glass suppliers and the sunlight intensity per the solar/climate conditions. The fiberglass plates can be cut from the Kemlite fiberglass panel with 30% or 10% transmittancy. Note that the shadow or shading coefficient of 0.3 implies that 30% of the sunlight are transmitted while 70% are reflected.

The reflective/absorbing coating is on one side of the glass plates, #1, only, say the left side in FIG. 3. When the light sensor, #7, detects strong sunlight intensity, the light reflective unit turns clockwise and closes. It reflects the sunlight outward to eliminate the glare. When the weather is cloudy, the unit turns and opens. The building is illuminated by the maximum daylight intensity.

The turning of the unit can be manual or automatic. FIGS. 3 and 4 show one of the design arrangements. The glass plates are enclosed in the metal or plastic structural envelopes, #9, with axles, #5, extending into the bushings, #10, at both ends. The axles are driven and turned by a looped wire, #4, and welded secondary wires 12 (multiple in number) which connect axles #5 and looped wire #7. The manual turning is achieved by pulling one of two wire outlet extensions #13, from the looped wire #4, in FIG. 3. The unit turns clockwise or counterclockwise.

For the automatic turning control, it shows that a light sensor, #7, is locating behind the glass plates. The glass plates and axles are turned by another vertical looped wire, i.e. a timing belt, #6, and a LAT motor, #8. At the end of the reflective unit, an engaged 12 or 6-poles LAT motor will turn the glass plate and axle by a fraction of half a circle, say 15 or 30 degrees. The light intensity is received and passed by the light sensor to an electrical switching circuit, #11, which then controls the turning of the LAT motor. The glass plates and axles are turning in a synchronized motion with the motor through the looped wire #4 and timing belt #6. When the light reflective unit is closed, the glass plates, #1, can be either overlapped with a small width or cleared to each other in a straight line position. In the daytime, the reflective unit closes with the reflective side facing outward.

The turning control unit is also equipped with a timer. During the night, the power to the motor bypasses the controlling switching circuit, and the phase of the current is reversed. Through an open/closed switch, the LAT motor turns from 12 to 9 o'clock to close in the winter, and from 9 to 12 o'clock to open in the summer. This allows the room's radiation heat to be kept within the room in the winter and escape out of the building in the summer.

The following flow chart diagram shows the control logic:

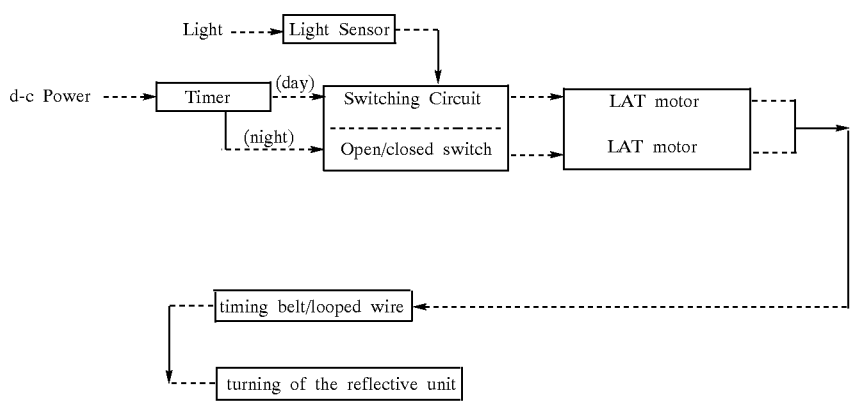

In the flow chart, the electric current/power is supplied through a timer. In the daytime, the power goes to a switching circuit. Also, a light sensor sends the light signal to the circuit and its intensity is converted to a voltage differential. This voltage differential in the switching circuit becomes a controlling device for the Limit-angle-torque motor to turn incremental steps of +/−15 or 30 degrees angle. When it is a sunny summer day, the reflective unit stays closed. When the light intensity is weak, the reflective unit reopens fully or partially up to a threshold angle with no glare.

In FIGS. 1 and 2, the horizontal and vertical reflective units have the shading coefficient selected such that the glare can be eliminated even with the strong sunlight intensity at the local climate. With the unit closed, the window/light shelf system will provide the daylight illumination. For the solar heating in the winter, the control logic may be modified that the reflected glare and solar heat are directed toward the ceiling or hall way of a building. This can be achieved by modifying the program of switching circuit. The reflective unit stays partially closed.

This window/light shelf system can be applied to an existing window with clear panes by installing a light reflective unit on either side with or without an additional exterior pane. The turning mechanism, the control unit, and the LAT motor can all be modified and substituted by other designs.

Although the preferred design of the invention has been illustrated and described herein, this invention is intended to encompass any rearrangement, modification and substitution of the parts, elements and material as fall within the spirit of the appended claims.

We claim:

1. An integrated window/light shelf system for use in the daylight illumination with no glare, summer solar heat reduction and winter solar heating of a building comprising:

a double panes window with enlarged air gap and an insulated wood or metal frame;

an inner positioned parallel, light reflective or absorbing, low transparent glass plates unit in the middle of said double panes;

a series of metal sheet envelopes holding said glass plates;

a series of bushings at both ends of said window frame;

a series of axles at the ends of said envelopes extending into said bushings at both ends of said window frame;

a looped wire and connecting secondary wires to turn said axles and said glass plates in synchronized step rotation; and a turning control mechanism with a timer, a light sensor, a switching circuit, an open/closed switch, a Limit-angle-torque motor and a timing belt.

2. The system in claim 1 wherein said light reflective or absorbing unit turns per said turning control mechanism to furnish the daylight illumination of a building in all directions with no glare in all solar/climate conditions.

3. The system in claim 1 wherein said light reflective or absorbing unit turns closed to reflect and reduce the summer solar heat and building cooling load in the day, and turns open to transmit a room's heat radiation for cooling down in the night.

4. The system in claim 1 wherein said light reflective or absorbing unit turns partially open or closed to re-reflect the glare and winter solar heat toward the ceiling or hall way of a building, and turns fully closed with reflective side of said glass plates facing inward to keep a room's heat radiation in the night.

* * * * *